US008126037B2

United States Patent
Choi et al.

(10) Patent No.: US 8,126,037 B2
(45) Date of Patent: Feb. 28, 2012

(54) WIRELESS MODEM SYSTEM AND METHOD FOR CONNECTING TO COMMUNICATION NETWORK USING THE SAME

(75) Inventors: Jae-Jean Choi, Yongin-si (KR); Hyung-Joo Cheon, Seoul-si (KR)

(73) Assignee: LG Electronics Inc., Seoul (KR)

( * ) Notice: Subject to any disclaimer, the term of this patent is extended or adjusted under 35 U.S.C. 154(b) by 896 days.

(21) Appl. No.: 12/173,676

(22) Filed: Jul. 15, 2008

(65) Prior Publication Data

US 2009/0103597 A1    Apr. 23, 2009

(30) Foreign Application Priority Data

Oct. 23, 2007 (KR) .......................... 10-2007-0106812

(51) Int. Cl.
*H04B 1/38* (2006.01)
*H04L 5/16* (2006.01)
(52) U.S. Cl. ...................................................... 375/222
(58) Field of Classification Search .................. 375/222
See application file for complete search history.

(56) References Cited

U.S. PATENT DOCUMENTS

2006/0120329 A1*  6/2006  Kim et al. ................... 370/331
2009/0004972 A1*  1/2009  Wang et al. ................. 455/63.1

FOREIGN PATENT DOCUMENTS

CN            1725901 A        1/2006

* cited by examiner

*Primary Examiner* — David C. Payne
*Assistant Examiner* — Tanmay Shah
(74) *Attorney, Agent, or Firm* — Birch, Stewart, Kolasch & Birch, LLP (57) ABSTRACT

A wireless modem connection apparatus including a connection unit for connecting a first and second modem and to a portable computer; and a control unit for detecting radio wave reception strength of each of first and second communication networks connected through the first and second modems and setting an operation mode of each of the first and second modems and depending on the radio wave reception strength, whereby a power limit of a USB interface is not exceeded even when both a wireless modem for a CDMA communication network and a wireless modem for a WiBro communication modem are simultaneously connected to a PC.

20 Claims, 7 Drawing Sheets

WIRELESS MODEM SYSTEM AND METHOD FOR CONNECTING TO COMMUNICATION NETWORK USING THE SAME

CROSS REFERENCE TO RELATED APPLICATIONS

The present application is related to, and claims priority to, Korean patent application 10-2007-0106812 filed on Oct. 23, 2007, the entire contents of which being incorporated herein by reference

BACKGROUND OF THE INVENTION

1. Field of the Invention

The present invention relates to a wireless modem, and more particularly, to a wireless modem system having a sleep mode applied thereto.

2. Description of the Related Art

Recently, with advancement of computer and communication technologies, a variety of wireless communication services provided using wireless communication networks are generalized. In addition to voice communication services provided through mobile communication terminals, the domain of the services is expanded even to multimedia communication services for transmitting circuit data, packet data and the like.

After the advent of Advanced Mobile Phone Systems (AMPS) of an analog cellular method categorized as a first generation mobile communication service and Global System for Mobile (GSM) and Code Division Multiple Access (CDMA) of a digital cellular method categorized as a second generation mobile communication service, International Mobile Telecommunication 2000 (IMT-2000) categorized as a third generation mobile communication service has been distributed recently.

Particularly, the IMT-2000 is classified into Wideband CDMA (WCDMA) of an asynchronous mode and CDMA-2000 of a synchronous mode. The WCDMA method is based on techniques related to wireless connection of a CDMA method and mobile communication networks of a GSM method, while the CDMA-2000 is based on techniques related to wireless connection and mobile communication networks of a CDMA method.

On the other hand, Wireless Broadband Internet (WiBro) service is a service for connecting to the Internet and using a variety of contents in a mobile environment of indoor and outdoor walking speed or medium-or-low speed using a portable mobile communication terminal.

Currently, wireless communication networks of a CDMA method are constructed throughout the nation, whereas wireless communication networks for WiBro services are limitedly constructed in some areas. Accordingly, in order to use both of the wireless communication networks, a wireless modem is driven by the following two methods.

First, the first method is to connect two USB type wireless modems for a personal computer (PC), which respectively support both of the communication networks, and simultaneously drive the wireless modems. Next, the second method is to drive a WiBro modem if a PC enters an area where WiBro services are provided and to drive a CDMA modem if the PC deviates from the area. Electrical current consumed when the first method is used and a driving time of a wireless modem when the second method is used are shown in FIGS. 1 and 2, respectively.

Figure 1:
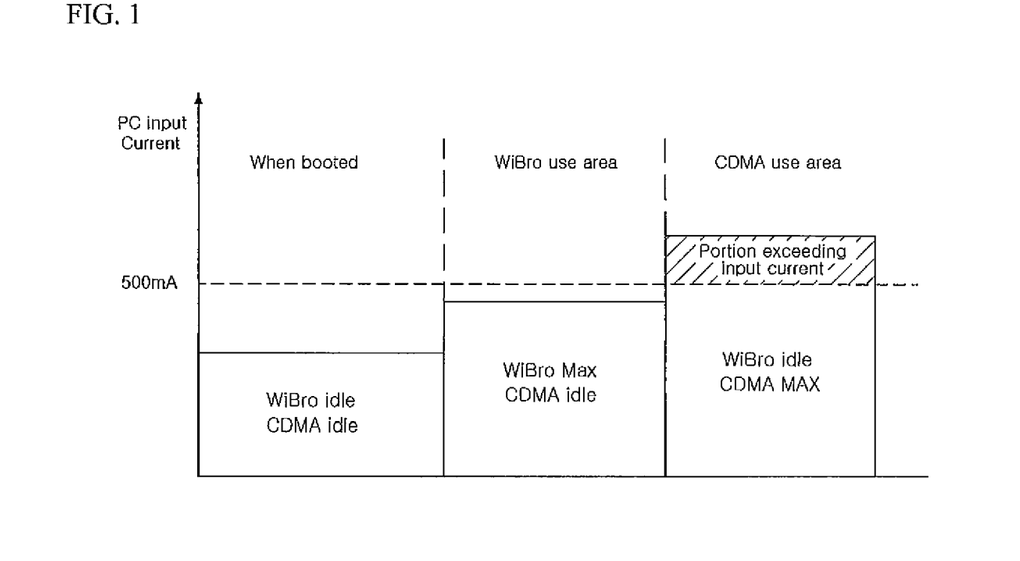
FIG. 1 is a view comparing electrical currents used when both of USB type WiBro and CDMA modems of a related art are connected to a PC and simultaneously driven.

FIG. 1 is a view comparing electrical currents used when both of USB type WiBro and CDMA modems of a related art are connected to a PC and simultaneously driven. As shown in FIG. 1, when both of the WiBro and CDMA modems are connected and driven, input current flowing through a USB port of the PC exceeds the power limit of 500 mA of a USB interface if a communication network is connected through the CDMA modem.

Figure 2:
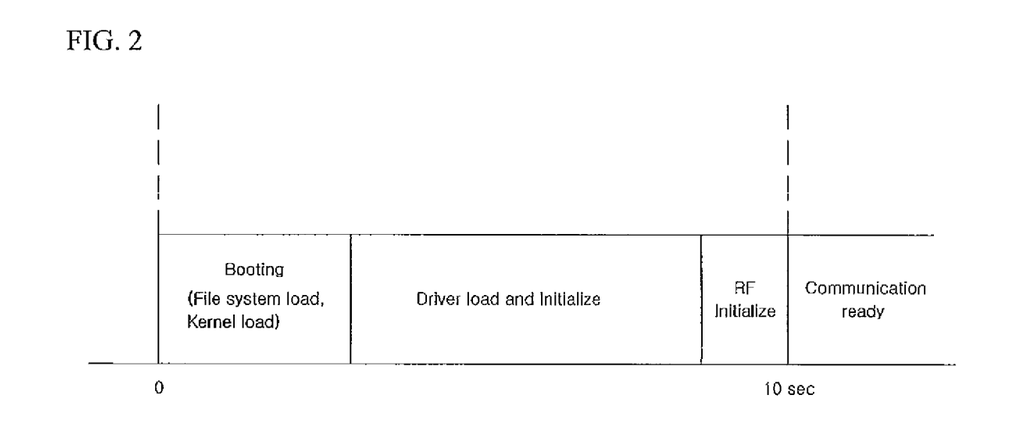
FIG. 2 is a view showing a driving time required when a conventional USB type modem is connected to a PC and driven.

FIG. 2 is a view showing a driving time required when a conventional USB type modem is connected to a PC and driven. As shown in FIG. 2, it takes more than 10 seconds until the USB type modem is connected to the PC and connects to a communication network from a power off state.

However, the above prior art has the following problems.

That is, if two of the wireless modems are simultaneously driven, there is a problem in that power limit of the USB interface limited to 500 mA is exceeded and thus breakdown of the PC may be invited. Particularly, since further higher power is used to be provided with Internet services in an area where radio wave reception strength is weak, the PC is further highly probable to be broken down due to excess of the power limit of the USB interface if the two wireless modems are simultaneously driven.

Furthermore, if the two modems are alternatively driven whenever the PC deviates from or enters a WiBro service area, there is a problem in that an extended booting time is required to register the location of the two wireless modems into respective communication networks.

SUMMARY OF THE INVENTION

Accordingly, the present invention is conceived to solve the aforementioned problems in the related art. An object of the present invention is to provide a wireless modem system, computer program product and method, in which a sleep mode is supported so that power limit of a USB interface is not exceeded even when both a CDMA modem for connecting to a CDMA communication network and a WiBro modem for connecting to a WiBro communication modem are simultaneously connected to a PC to be used.

According to another aspect of the present invention, there is provided a wireless modem system, computer program product, and method, in which a sleep mode is supported so that a corresponding wireless modem does not need to be booted each time when a PC deviates from or enters an area where WiBro services are provided.

According to an aspect of the present invention for achieving the objects, there is provided a wireless modem connection apparatus, which comprises: a connection unit for connecting a first modem and a second modem to a portable computer; and a control unit for detecting radio wave reception strength of each of first and second communication networks connected through the first and second modems and setting an operation mode of each of the first and second modems depending on the radio wave reception strength.

At this time, the operation mode may include a working mode and a steep mode, and the control unit may set the operation mode so that the first modem is set to the working mode and the second modem is set to the sleep mode or the first modem is set to the sleep mode and the second modem is set to the working mode.

In addition, the control unit may set the modem, which is set to the working mode, to the sleep mode if a signal-to-noise ratio of the communication network connected through the modem, which is set to the working mode, is higher than a limit value.

Further, the first modem and the second modem may be respectively a WiBro modem and a CDMA modem.

At this time, the control unit may detect the radio wave reception strength of the WiBro communication network at predetermined time intervals.

In addition, the control unit may set the WiBro modem to the working mode and the CDMA modem to the sleep mode if the radio wave reception strength of the WiBro communication network is higher than a predetermined value.

Further, the control unit may set the WiBro modem to the sleep mode and the CDMA modem to the working mode if the signal-to-noise ratio of the WiBro communication network is higher than a limit value.

At this time, the connection unit may connect the first modem and the second modem to the portable computer through USB interfaces.

In the meantime, according to another aspect of the present invention, there is provided a wireless modem system, which comprises: a first modem including a first control module for detecting radio wave reception strength of a first communication network and setting an operation mode; a second modem including a second control module for detecting radio wave reception strength of a second communication network and setting an operation mode; and an interface module receiving the radio wave reception strength of the first communication network from the first control module and transmitting the radio wave reception strength to the second control module, the interface module receiving the radio wave reception strength of the second communication network from the second control module and transmitting the radio wave reception strength to the first control module, wherein the first control module and the second control module respectively compares the detected radio wave reception strength with the radio wave reception strength received from the interface module and sets the operation modes of the first modem and the second modem.

At this time, the operation mode may include a working mode and a sleep mode, and the first control module and the second control module may set the operation mode so that the first modem is set to the working mode and the second modem is set to the sleep mode or the first modem is set to the sleep mode and the second modem is set to the working mode.

In addition, the first control module and the second control module may set the operation mode so that if the radio wave reception strength of the first communication network is higher than a predetermined value, the first modem is set to a working mode and the second modem is set to a sleep mode.

Further, the first control module and the second control module may set the modem, which is set to the working mode, to the sleep mode if a signal-to-noise ratio of the communication network connected through the modem, which is set to the working mode, is higher than a limit value.

At this time, the first modem and the second modem may be respectively a WiBro modem and a CDMA modem, and the first control module and the second control module may be respectively a WiBro control module and a CDMA control module.

In addition, the WiBro control module may detect radio wave reception strength of a WiBro communication network at predetermined time intervals.

Further, the WiBro control module may transfer a control signal for setting the WiBro modem to the working mode if the radio wave reception strength of the WiBro communication network is higher than a predetermined value.

At this time, the WiBro control module may transfer a control signal for setting the WiBro modem to the sleep mode if a signal-to-noise ratio of the WiBro communication network is higher than a limit value.

In addition, the interface module may connect the WiBro modem and the CDMA modem to a portable computer through USB interfaces and transmit the radio wave reception strength between the WiBro control module and the CDMA control module.

In the meantime, according to a further aspect of the present invention, there is provided a Multi-Band Multi-Mode (MBMM) wireless modem, which comprises: a first modem unit for connecting to a first communication network; a second modem unit for connecting to a second communication network; and a microcontroller detecting radio wave reception strength of each of the first and second communication networks respectively connected through the first and second modem units and setting an operation mode of each of the first and second modem units.

At this time, the operation mode may include a working mode and a sleep mode, and the microcontroller may set the operation mode so that the first modem unit is set to the working mode and the second modem unit is set to the sleep mode or the first modem unit is set to the sleep mode and the second modem unit is set to the working mode.

In addition, the microcontroller may set the modem unit, which is set to the working mode, to the sleep mode if a signal-to-noise ratio of the communication network connected through the modem unit, which is set to the working mode, is higher than a limit value.

Further, the first modem unit and the second modem unit may be respectively a WiBro modem unit and a CDMA modem unit.

At this time, the microcontroller may detect radio wave reception strength of a WiBro communication network at predetermined time intervals.

In addition, the microcontroller may set the WiBro modem to the working mode and the CDMA modem to the sleep mode if the radio wave reception strength of the WiBro communication network is higher than a predetermined value.

Further, the microcontroller may set the WiBro modem to the sleep mode and the CDMA modem to the working mode if the signal-to-noise ratio of the WiBro communication network is higher than the limit value.

At this time, the MBMM wireless modem may be connected to a portable computer through a USB interface and transmits and receives signals.

In the meantime, according to a still further aspect of the present invention, there is provided a method for connecting to a communication network of a wireless modem, which comprises the steps of: (a) detecting radio wave reception strength of each of first and second communication networks at predetermined time intervals; (b) setting an operation mode of each of first and second modems depending on the detected radio wave reception strength; and (c) connecting to a corresponding communication network through the modem set to a working mode.

At this time, in step (b), the first modem may be set to the working mode and the second modem may be set to a steep mode, or the first modem may be set to the sleep mode and the second modem may be set to the working mode.

In addition, the method may further comprise the steps of: (d) detecting a signal-to-noise ratio of the communication network connected through the modem set to the working mode at predetermined time intervals; and (e) setting each of the first and second modems to the working mode or the sleep mode depending on the detected signal-to-noise ratio.

Further, wherein the first modem and the second modem may be respectively a WiBro modem and a CDMA modem.

At this time, in step (b), the WiBro modem may be set to the working mode and the CDMA modem may be set to the sleep mode if the radio wave reception strength of the WiBro communication network is higher than a predetermined value.

In addition, in step (e), the WiBro modem may be set to the sleep mode and the CDMA modem may be set to the working mode if the signal-to-noise ratio of the WiBro communication network is higher than a limit value.

Further, the WiBro modem and the CDMA modem may be connected to a portable computer through USB interfaces.

According to a wireless modem system of the present invention and a method for connecting to a communication network using the same, the following advantages can be expected.

That is, since power limit of a USB interface is not exceeded even when both a wireless modem for connecting to a CDMA communication network and a wireless modem for connecting to a WiBro communication modem are simultaneously connected to a PC to be used, there is an advantage in that there can be provided a wireless communication system in which the PC is free from being worried about to be broken down.

Furthermore, according to the present invention, the wireless modem capable of providing Internet services does not need to be booted when the PC deviates from or enters an area where WiBro services are provided. Thus, there is an advantage in that wireless Internet services can be further smoothly provided

BRIEF DESCRIPTION OF THE DRAWINGS

The above and other features and advantages of the present invention will become apparent from the following description of preferred embodiments given in conjunction with the accompanying drawings, in which.

DESCRIPTION OF THE PREFERRED EMBODIMENTS

Hereinafter, preferred embodiments of a wireless modem system according to the present invention described above and a method for connecting to a communication network using the same will be described in more detail with reference to the accompanying drawings.

Figure 5:
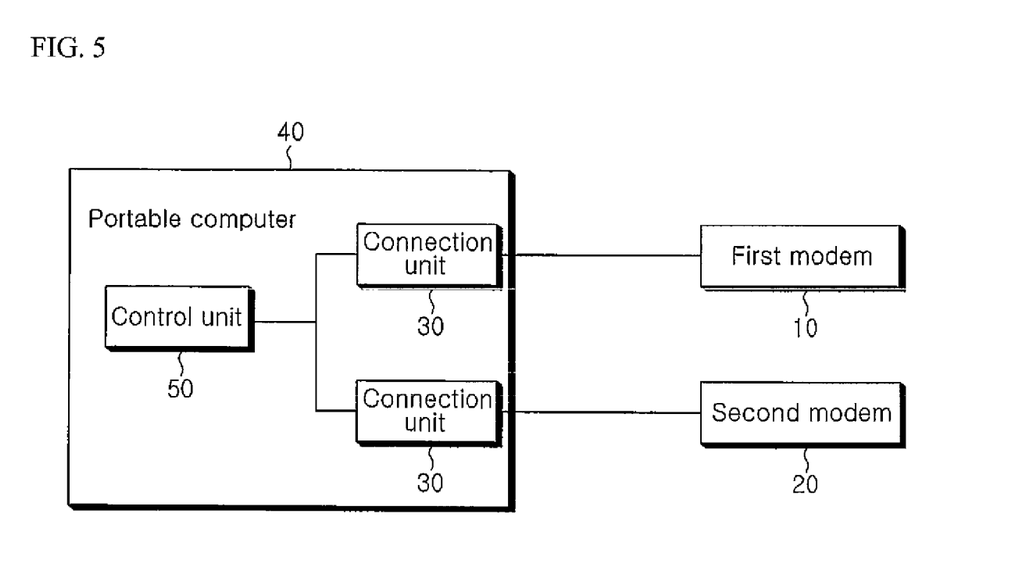
FIG. 5 is a block diagram showing a wireless modem connection apparatus configuring a specific embodiment of the present invention.

FIG. 5 is a block diagram showing a wireless modem connection apparatus configuring a specific embodiment of the present invention.

As shown in FIG. 5, the wireless modem connection apparatus configuring the specific embodiment of the present invention includes a connection unit 30 for connecting a first modem 10 and a second modem 20 to a portable computer 40.

At this time, the first modem 10 is connected to a first communication network, and the second modem 20 is connected to a second communication network.

In addition, the first modem 10 and the second modem 20 may be a WiBro modem and a CDMA modem, respectively. Then, the first communication network and the second communication network may be a WiBro communication network and a CDMA communication network, respectively.

Then, the first modem 10 and the second modem 20 respectively receive RF signals transmitted from base stations of the first communication network and the second communication network through an RF antenna. That is, if the first modem 10 is a WiBro modem and the second modem 20 is a CDMA modem, RF antennas of the WiBro modem and the CDMA modem receive RF signals from the base stations of the first communication network and the second communication network. The received RF signals are demodulated by the first modem 10 and the second modem 20 and transferred to the hand held computer 40.

At this time, the connection unit 30 may connect the first modem 10 and the second modem 20 to the portable computer 40 through USB interfaces. That is, the connection unit 30 can be provided in the portable computer 40 in the form of a USB hub to connect the first modem 10 and the second modem 20 to the portable computer 40.

In the meantime, the wireless modem connection apparatus configuring the specific embodiment of the present invention includes a control unit 50. The control unit 50 detects radio wave reception strength of the first and second communication networks connected through the first and second modems 10 and 20 and sets operation modes of the first and second modems 10 and 20 depending on the radio wave reception strength.

At this time, the radio wave reception strength means strength of radio waves received by a wireless modem connected to a communication network to be provided with Internet services. For example, the control unit 50 may detect strength of radio wave signals received from the connected first and second communication networks in the form of a Received Signal Strength Indication (RSSI).

In addition, the operation mode may include a working mode and a sleep mode. That is, the control unit detects radio wave reception strength of each of the first communication network and the second communication network and may set the first modem to the working mode and the second modem to the sleep mode, or the first modem to the sleep mode and the second modem to the working mode.

At this time, the sleep mode is a system state after the system loads a file system, kernel and drivers and performs a process of initializing an RF system to connect to a communication network while power of the modem is turned off and before the system connects to a communication network. The sleep mode means a state where only power is supplied to immediately wake up a processor by a predetermined input signal while the processor is in a halted state.

Then, the working mode is a system state after the system loads a file system, kernel and drivers and performs a process of initializing an RF system to connect to a communication network while power of the modem is turned off and then the system connects to a communication network. Here, the working mode includes three states of IDLE, NORMAL and MAX, wherein the IDLE mode is a state of standby to be used or a state of operating the processor clock in minimum while communication is not performed, and the MAX mode means a state in which the processor clock is set to maximum to communicate and communication is actively performed.

In addition, the control unit 50 may detect a signal-to-noise ratio of a communication network connected by the modem set to the working mode and set the modem, which is set to the working mode, to the sleep mode.

At this time, the signal-to-noise ratio of the communication network is a criterion used for power control and adaptive modulation and demodulation, such as a Carrier to Interference Noise Ratio (CINR), and is a value obtained by dividing the total sum of signal power of sub-carriers by the sum of noise and interference power.

That is, the control unit 50 may set each of the first and second modems 10 and 20 to the sleep mode or the working mode by detecting the value obtained by dividing the total sum of signal power of sub-carriers by the sum of noise and interference power.

In addition, the control unit 50 is included in the portable computer 40. The first modem 10 and the second modem 20 are connected to the portable computer 40 through the connection unit 30, and the control unit 50 included in the portable computer 40 may set each of the first and second modems 10 and 20 to the working mode or the sleep mode.

Figure 3:
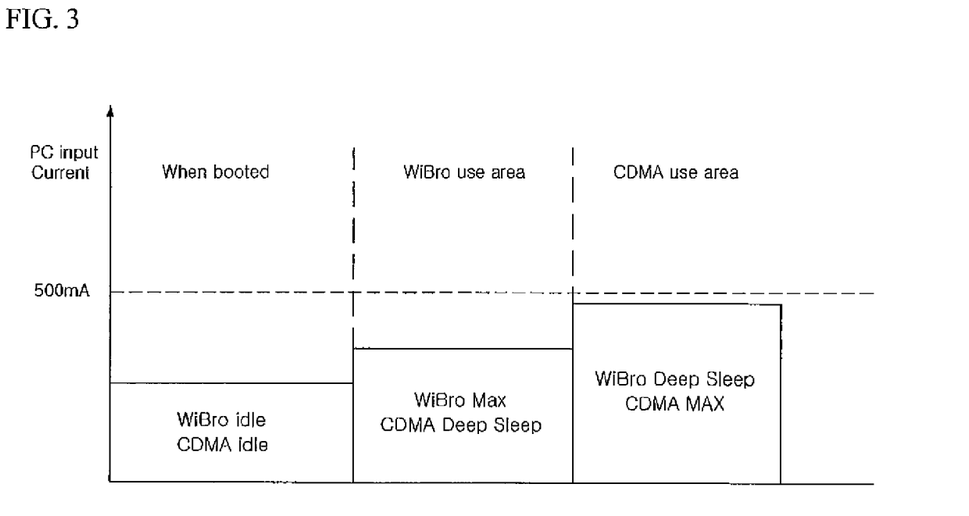
FIG. 3 is a view comparing input currents when both of USB type WiBro and CDMA modems according to an embodiment of the present invention are connected to a PC and simultaneously driven.

FIG. 3 is a view comparing input currents when both of USB type WiBro and CDMA modems according to an embodiment of the present invention are connected to a PC and simultaneously driven.

As shown in FIG. 3, according to the embodiment of the present invention, power limit of the USB interface may not be exceeded by setting any one of the first and second modems to the working mode. That is, if the WiBro modem and the CDMA modem are respectively set to the sleep mode and the working mode or the WiBro modem and the CDMA modem are respectively set to the working mode and the sleep mode, input current of a USB port is lower than 500 mA, and there is an advantage in that the PC is free from being worried about to be broken down.

Figure 4:
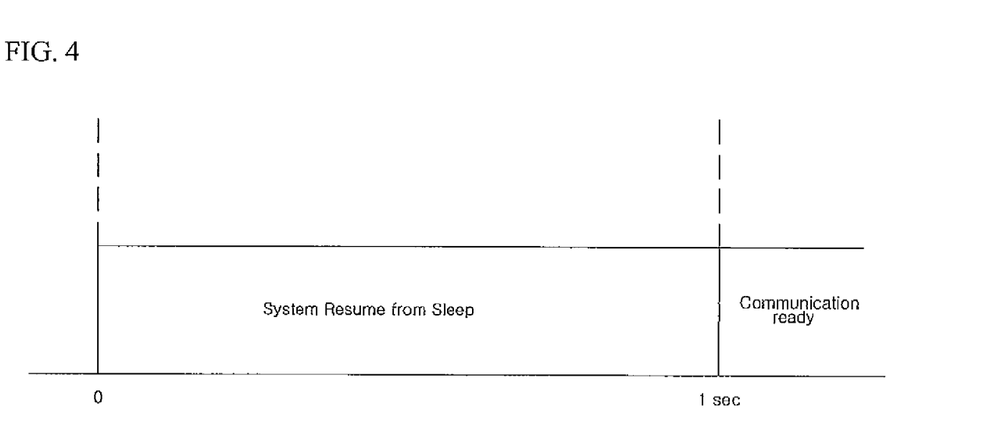
FIG. 4 is a view showing a driving time required when a USB type modem according to the embodiment of the present invention is connected to a PC and driven.

FIG. 4 is a view showing a driving time required when a USB type modem according to the embodiment of the present invention is connected to a PC and driven.

As shown in FIG. 4, according to the embodiment of the present invention, since any one of the first and second modems is set to the working mode and the other modem is set to the sleep mode, an extended booting time may not be required when switching over between the first modem and the second modem. That is, there is an advantage in that only the time needed for switching over the system from the sleep mode to the working mode is required instead of the driving time required for loading a file system, kernel and drivers and initializing an RF system.

Therefore, according to the wireless modem connection apparatus configuring the specific embodiment of the present invention, since any one of the first and second modems is set to the working mode and the other modem is set to the sleep mode, a problem of requiring an extended booting time when the first modem and the second modem are switched over can be solved while power limit of the USB port is not exceeded.

Hereinafter, the operation of the control unit 50 will be described in detail with an example where the first modem and the second modem are a WiBro modem and a CDMA modem, respectively.

First, the control unit 50 detects radio wave reception strength of the WiBro communication network at predetermined time intervals and sets the WiBro modem to the working mode and the CDMA modem to the sleep mode if the detected radio wave reception strength of the WiBro communication network is higher than a predetermined value.

At this time, the predetermined value may represent radio wave reception strength that is required to be provided with Internet services in which the speed of transmitting and receiving data is recorded above a specific value.

Then, the predetermined time interval may be set to a time interval for detecting the radio wave reception strength to determine whether the portable computer deviates from or enters a WiBro service area.

For example, if the portable computer deviates from an area where both the WiBro and CDMA communication networks can be used and enters an area where only the CDMA communication network is provided, the radio wave reception strength detected at the predetermined time intervals can be lower than the predetermined value. At this time, the control unit 50 may set the WiBro modem to the sleep mode and the CDMA modem to the working mode.

Contrarily, if the portable computer deviates from an area where only the CDMA communication network is provided and enters an area where both of the WiBro and CDMA communication networks are provided, the radio wave reception strength detected at the predetermined time intervals may be higher than the predetermined value. At this time, the control unit 50 may set the WiBro modem to the working mode and the CDMA modem to the sleep mode.

Then, the control unit 50 detects a signal-to-noise ratio of the WiBro communication network. At this time, if the detected signal-to-noise ratio of the WiBro communication network is lower than a limit value, the WiBro modem is set to the sleep mode, and the CDMA modem is set to the working mode.

At this time, the limit value may represent a minimum signal-to-noise ratio required to connect to the WiBro communication network and to be provided with WiBro services.

For example, if signals between a base station and another base station generate noise and interference in an area where the WiBro services are provided, it is determined whether the detected signal-to-noise ratio of the WiBro communication network is lower than the limit value, and the WiBro modem can be set to the sleep mode if the signal-to-noise ratio is higher than the limit value.

Figure 6:
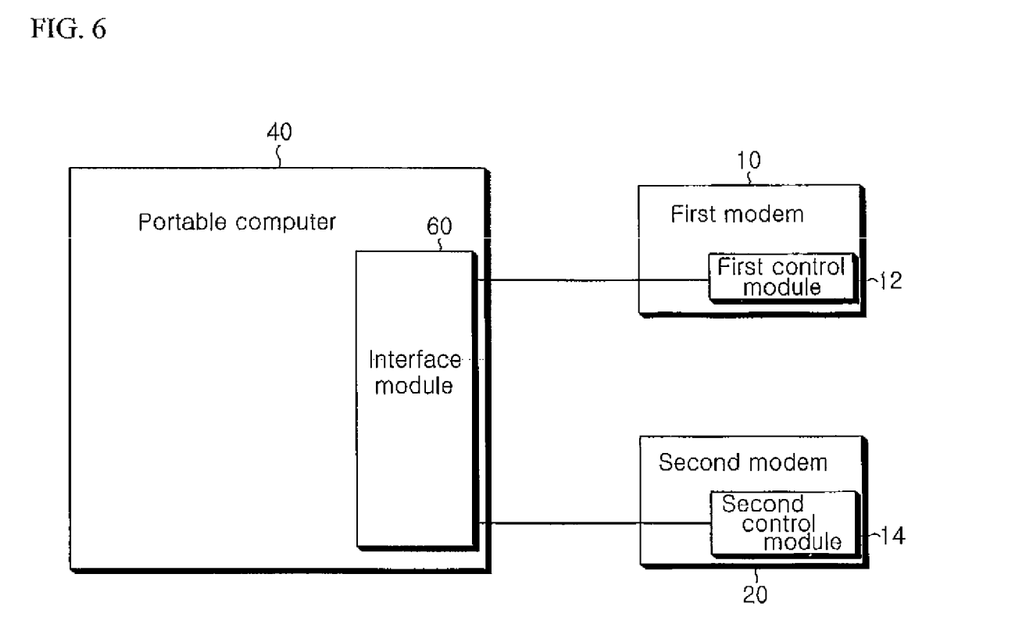
FIG. 6 is a block diagram showing a wireless modem system configuring another embodiment of the present invention.

FIG. 6 is a block diagram showing a wireless modem system configuring another embodiment of the present invention.

As shown in FIG. 6, the wireless modem system configuring the other embodiment of the present invention includes a first modem 10 and a second modem 20. At this time, the first modem 10 is connected to a first communication network, and the second modem 20 is connected to a second communication network. The first modem 10 and the second modem 20 include a first control module 12 and a second control module 14, respectively.

In addition, the first modem 10 and the second modem 20 may be a WiBro modem and a CDMA modem, respectively. Then, the first communication network and the second communication network may be a WiBro communication network and a CDMA communication network, respectively.

Then, the first modem 10 and the second modem 20 respectively receive RF signals transmitted from base stations of the first communication network and the second communication network through an RF antenna That is, if the first modem 10 is a WiBro modem and the second modem 20 is a CDMA modem, RF antennas of the WiBro modem and the CDMA modem receive RF signals from the base stations of the first communication network and the second communication network. The received RF signals are demodulated by the first modem 10 and the second modem 20 and transferred to a hand held computer 40.

In the meantime, the wireless modem system configuring the other embodiment of the present invention includes an interface module 60. At this time, the interface module 60 receives radio wave reception strength of the first communication network from the first control module 12 and transmits the strength to the second control module 14, and receives radio wave reception strength of the second communication network from the second control module 14 and transmits the strength to the first control module 12.

In addition, the interface module 60 connects the portable computer 40 to the first modem 10 and the second modem 20 through USB interfaces and may transmit radio wave reception strength between the first control module 12 and the second control module 14. That is, the interface module 60 can be provided in the form of a USB hub in the portable computer 40 to connect the first modem 10 and the second modem 20 to the portable computer 40.

Meanwhile, the first modem 10 and the second modem 20 respectively include the first control module 12 and the second control module 14. At this time, the first control module 12 detects radio wave reception strength of the first communication network and sets the operation mode of the first modem 10. In addition the second control module 14 detects radio wave reception strength of the second communication network and sets the operation mode of the second modem 20. At this time, the operation mode may include a working mode and a sleep mode.

In addition, the first control module 12 and the second control module 14 respectively may detect radio wave reception strength of the first communication network and the second communication network in the form of an RSSI.

Then, the first control module 12 and the second control module 14 may set the first modem 10 to the working mode and the second modem 20 to the sleep mode, or the first modem 10 to the sleep mode and the second modem 20 to the working mode.

In addition, if the radio wave reception strength of the first communication network is higher than a predetermined value, the first control module 12 and the second control module 14 may set the first modem 10 to the working mode and the second modem 20 to the sleep mode. For example, in a case where the first modem 10 and the second modem 20 are respectively a WiBro modem and a CDMA modem, if radio wave reception strength of the WiBro communication network is higher than a predetermined value, a WiBro control module included in the WiBro modem may set the WiBro modem to the working mode and the CDMA modem to the sleep mode. At this time, the predetermined value may represent radio wave reception strength that is required to be provided with Internet services in which the speed of transmitting and receiving data is recorded above a specific value.

Then, if the signal-to-noise ratio of a communication network connected by a modem that is set to the working mode is lower than a limit value, the first control module 12 and the second control module 14 may set the modem) which is set to the working mode, to the sleep mode.

At this time, the first control module 12 and the second control module 14 may detect the signal-to-noise ratios of the first and second communication networks in the form of a CINR.

According to a wireless modem system configuring the other embodiment of the present invention, since any one of the first and second modems is set to the working mode and the other modem is set to the sleep mode, a problem of requiring an extended booting time when the first modem and the second modem are switched over can be solved while power limit of the USB port is not exceeded, as shown in FIGS. 3 and 4.

Hereinafter, the operation of a WiBro control module and a CDMA control module will be described in detail with an example where the first modem and the second modem are respectively a WiBro modem and a CDMA modem and the first control module 12 and the second control module 14 are respectively the WiBro control module and the CDMA control module.

First, the WiBro control module detects radio wave reception strength of the WiBro communication network at predetermined time intervals, and transfers a control signal for setting the WiBro modem to the working mode to the interface module 60 if the detected radio wave reception strength of the WiBro communication network is higher than a predetermined value.

At this time, the predetermined value may represent radio wave reception strength that is required to be provided with WiBro services in which the speed of transmitting and receiving data is recorded above a specific value.

Then, the predetermined time interval may be set to a time interval for detecting the radio wave reception strength to determine whether the portable computer deviates from or enters a WiBro service area.

For example, if the portable computer deviates from an area where both of the WiBro and CDMA communication networks can be used and enters an area where only the CDMA communication network is provided, the radio wave reception strength detected at the predetermined time intervals can be lower than the predetermined value. At this time, the WiBro control module may transfer a control signal for setting the WiBro modem to the sleep mode to the interface module 60.

Contrarily, if the portable computer deviates from an area where only the CDMA communication network is provided and enters an area where both of the WiBro and CDMA communication networks are provided, the radio wave reception strength detected at the predetermined time intervals may be higher than the predetermined value. At this time, the WiBro control module may transfer a control signal for setting the WiBro modem to the working mode.

Then, the WiBro control module detects a signal-to-noise ratio of the WiBro communication network. At this time, if the detected signal-to-noise ratio of the WiBro communication network is lower than a limit value, the WiBro control module may transfer a control signal for setting the WiBro modem to the sleep mode to the interface module 60.

At this time, the limit value may represent a minimum signal-to-noise ratio required to connect to the WiBro communication network and to be provided with WiBro services.

For example, if signals between a base station and another base station generate noise and interference in an area where the WiBro services are provided, it is determined whether the detected signal-to-noise ratio is lower than the limit value, and the WiBro modem can be set to the sleep mode if the signal-to-noise ratio is higher than the limit value.

Figure 7:
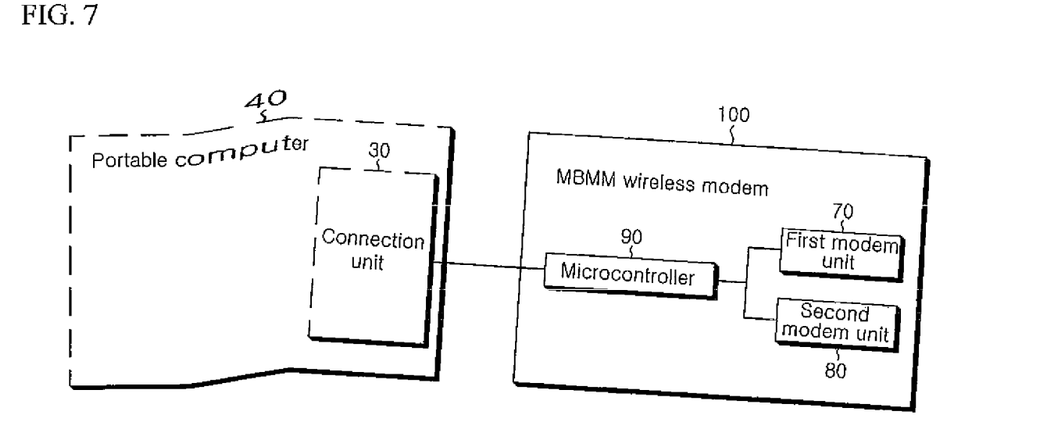
FIG. 7 is a block diagram showing a Multi-Band Multi-Mode (MBMM) wireless modem configuring a further embodiment of the present invention.

FIG. 7 is a block diagram showing a Multi-Band Multi-Mode (MBMM) wireless modem configuring a further embodiment of the present invention.

As shown in FIG. 7, the MBMM wireless modem 100 configuring the further embodiment of the present invention includes a first modem unit 70 and a second modem unit 80. The first modem unit 70 is connected to a first communication network, and the second modem unit 80 is connected to a second communication network.

At this time, the first modem unit 70 and the second modem unit 80 may be a WiBro modem and a CDMA modem, respectively. Then, the first communication network and the second communication network may be a WiBro communication network and a CDMA communication network, respectively.

Then, the first modem unit 70 and the second modem unit 80 respectively receive RF signals transmitted from base stations of the WiBro communication network and the CDMA communication network through an RF antenna. That is, if the first modem unit 70 is a WiBro modem and the second modem unit 80 is a CDMA modem, RF antennas of the WiBro modem and the CDMA modem receive RF signals from the base stations of the WiBro communication network and the CDMA communication network. In addition, the RF signals received through the RF antennas are categorized based on the frequency, demodulated by the first modem unit 70 and the second modem unit 80, and transferred to the hand held computer 40.

Meanwhile, the MBMM wireless modem 100 configuring the further embodiment of the present invention includes a microcontroller 90. The microcontroller 90 detects radio wave reception strength of the first communication network and the second communication network connected by the first modem unit 70 and the second modem unit 80 and sets operation modes of the first modem unit 70 and the second modem unit 80.

At this time, the radio wave reception strength means strength of radio waves received by a wireless modem connected to a communication network to be provided with Internet services. For example, the microcontroller 90 may detect strength of radio wave signals received from the first communication network and the second communication network in the form of an RSSI.

In addition, the operation mode may include a working mode and a sleep mode. That is, the microcontroller 90 detects radio wave reception strength of the first communication network and the second communication network and may set the first modem unit 70 to the working mode and the second modem unit 80 to the sleep mode, or the first modem unit 70 to the sleep mode and the second modem unit 80 to the working mode.

In addition, the microcontroller 90 may detect a signal-to-noise ratio of a communication network connected by the modem unit set to the working mode and set the modem unit, which is set to the working mode, to the sleep mode.

At this time, the signal-to-noise ratio of the communication network is a criterion used for power control and adaptive modulation and demodulation, and means a value obtained by dividing the total sum of signal power of sub-carriers by the sum of noise and interference power. For example, the microcontroller 90 may detect the signal-to-noise ratios of radio wave signals received from the first communication network and the second communication network in the form of a CINR.

Meanwhile, the MBMM wireless modem 100 configuring the further embodiment of the present invention is connected to the portable computer 40 through the connection unit 30 provided in the portable computer 40.

At this time, the connection unit 30 may connect the MBMM wireless modem 100 to the portable computer 40 through a USB interface. That is, the connection unit 30 can be provided in the portable computer 40 in the form of a USB hub to connect the MBMM wireless modem 100 to the portable computer 40.

According to the MBMM wireless modem configuring the further embodiment of the present invention, since any one of the first and second modem units is set to the working mode and the other modem unit is set to the sleep mode, as shown in FIGS. 3 and 4, a problem of requiring an extended booting time when the first modem unit and the second modem unit are switched over can be solved while power limit of the USB port is not exceeded.

Hereinafter, the operation of the microcontroller 90 will be described in detail with an example where the first modem unit 70 and the second modem unit 90 are respectively a WiBro modem and a CDMA modem.

First, the microcontroller 90 detects radio wave reception strength of the WiBro communication network at predetermined time intervals and sets the WiBro modem to the working mode and the CDMA modem to the sleep mode if the detected radio wave reception strength of the WiBro communication network is higher than a predetermined value.

At this time, the predetermined value may represent radio wave reception strength that is required to be provided with Internet services in which the speed of transmitting and receiving data is recorded above a specific value.

Then, the predetermined time interval may be set to a time interval for detecting the radio wave reception strength to determine whether the portable computer deviates from or enters a WiBro service area.

For example, if the portable computer deviates from an area where both of the WiBro and CDMA communication networks can be used and enters an area where only the CDMA communication network is provided, the radio wave reception strength detected at the predetermined time intervals can be lower than the predetermined value. At this time, the microcontroller 90 may set the WiBro modem to the sleep mode and the CDMA modem to the working mode.

Contrarily, if the portable computer deviates from an area where only the CDMA communication network is provided and enters an area where both of the WiBro and CDMA communication networks are provided, the radio wave reception strength detected at the predetermined time intervals may be higher than the predetermined value. At this time, the microcontroller 90 may set the WiBro modem to the working mode and the CDMA modem to the sleep mode.

Then, the microcontroller 90 detects a signal-to-noise ratio of the WiBro communication network. At this time, if the detected signal-to-noise ratio of the WiBro communication network is lower than a limit value, the WiBro modem is set to the sleep mode, and the CDMA modem is set to the working mode.

At this time, the limit value may represent a minimum signal-to-noise ratio required to connect to the WiBro communication network and to be provided with WiBro services.

For example, if signals between a base station and another base station generate noise and interference in an area where WiBro services are provided, it is determined whether the detected signal-to-noise ratio is lower than the limit value, and the WiBro modem can be set to the sleep mode if the signal-to-noise ratio is lower than the limit value.

Hereinafter, a preferred embodiment of a method for connecting to a communication network of a wireless modem according to the present invention described above will be explained in detail with reference to the accompanying drawings.

Figure 8:
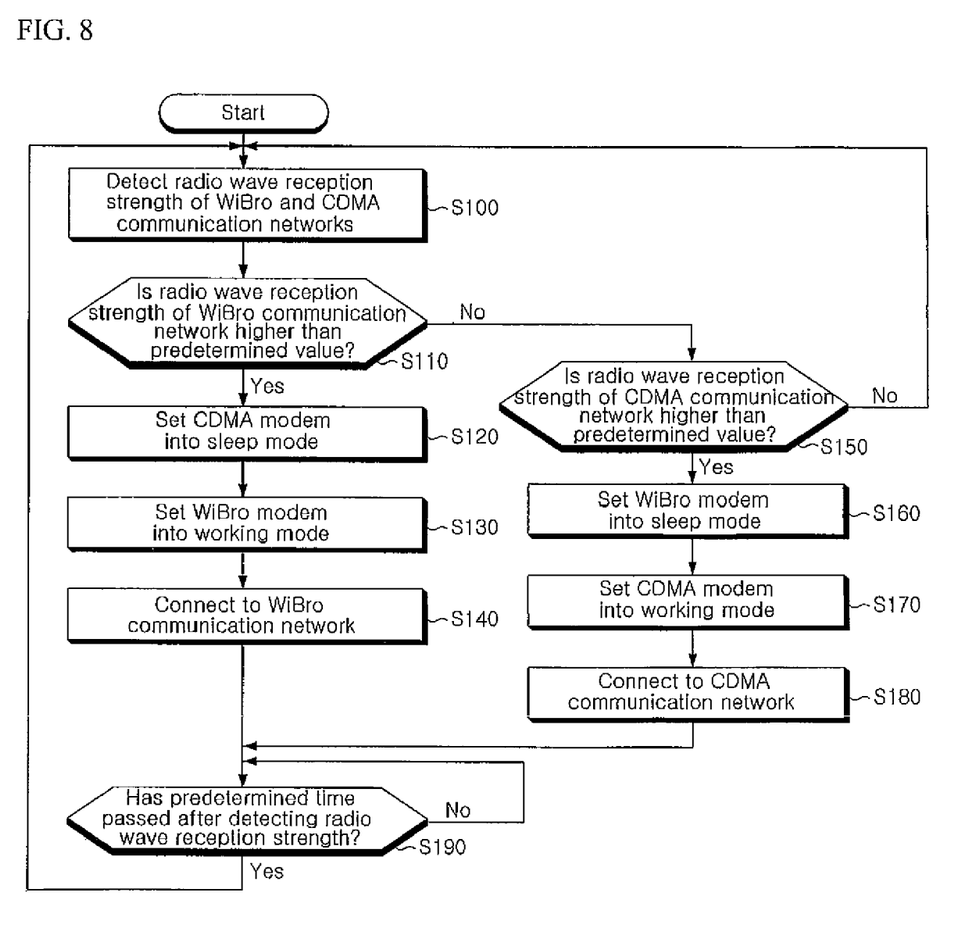
FIG. 8 is a flowchart specifically illustrating a method for connecting to a communication network of a wireless modem according to a specific embodiment of the present invention.

FIG. 8 is a flowchart specifically illustrating a method for connecting to a communication network of a wireless modem according to a specific embodiment of the present invention.

As shown in FIG. 8, the method for connecting to a communication network of a wireless modem according to the specific embodiment of the present invention starts from a step of detecting radio wave reception strength of WiBro and CDMA communication networks (step S100).

At this time, the radio wave reception strength is detected to determine whether the current position at which a user desires to connect to a communication network is in an area appropriate for connecting to the WiBro communication network or in an area appropriate for connecting to the CDMA communication network.

At this time, the radio wave reception strength means strength of radio waves received by a wireless modem connected to a communication network to be provided with Internet services. For example, the radio wave reception strength of the WiBro and CDMA communication networks, i.e., strength of radio wave signals received by a WiBro modem and a CDMA modem to be provided with Internet services, can be detected in the form of an RSSI. That is, RSSI values of the WiBro and CDMA communication networks are detected and it can be determined whether to set each of the WiBro and CDMA modems into the sleep mode or working mode.

Next, it is determined whether the radio wave reception strength of the time, if the radio wave reception strength of the WiBro communication network is higher than a predetermined value, step S120 is performed, whereas if the radio wave reception strength of the WiBro communication network is lower than a predetermined value, step S150 is performed.

At this time, the predetermined value may represent radio wave reception strength that is required to be provided with WiBro services in which the speed of transmitting and receiving data is recorded above a specific value.

Subsequently, if the radio wave reception strength of the WiBro communication network is higher than a predetermined value in step S110, the CDMA modem is set into the sleep mode (step S120).

At this time, the sleep mode is a system state after the system loads a file system, kernel and drivers and performs a process of initializing an RF system to connect to a communication network while power of the modem is turned off and before the system connects to a communication network. The sleep mode means a system state in which the radio wave reception strength of the communication network can be detected.

Next, the WiBro modem is set into the working mode (step S130).

At this time, the working mode is a system state after the system loads a file system, kernel and drivers and performs a process of initializing an RF system to connect to a communication network while power of the modem is turned off and then the system connects to a communication network.

Subsequently, the portable computer connects to the WiBro communication network through the WiBro modem (step S140).

In the meantime, if the radio wave reception strength of the WiBro communication network is lower than a predetermined value in step S110, it is determined whether radio wave reception strength of the CDMA communication network is higher than the predetermined value (step S150). At this time, if the radio wave reception strength of the CDMA communication network is higher than a predetermined value, step S160 is performed, whereas if the radio wave reception strength of the CDMA communication network is lower than the predetermined value, step S100 is performed.

At this time, the predetermined value may represent radio wave reception strength received through the CDMA modem that is required to be provided with Internet services in which the speed of transmitting and receiving data is recorded above a specific value.

Next, if the radio wave reception strength of the CDMA communication network is higher than a predetermined value in step S150, the WiBro modem is set into the sleep mode (step S160).

Then, the CDMA modem is set into the working mode (step S170).

Subsequently, the portable computer connects to the CDMA communication network through the CDMA modem (step S180).

Thereafter, it is determined whether a predetermined time period has been passed after the radio wave reception strength is detected (step S190). At this time, if a predetermined time period has been passed after the radio wave reception strength is detected, step S100 is performed, whereas if a predetermined time period has not been passed after the radio wave reception strength is detected, step S190 is performed again.

That is, the radio wave reception strength of the WiBro and CDMA communication networks of step S100 is detected at the predetermined time intervals. At this time, the predetermined time interval may be set to a time interval for detecting the radio wave reception strength to determine whether the portable computer deviates from or enters a WiBro service area.

In addition, if the radio wave reception strength of the CDMA communication network is lower than a predetermined value in step S150, the radio wave reception strength of both of the WiBro and CDMA communication networks is lower than the predetermined value. Therefore, it is determined that a radio wave receive state is improper for the portable computer to be connected to the WiBro or CDMA communication network and provided with Internet services, and thus, step S100 is performed again.

That is, it is determined that the current position of the user is not an appropriate position to be connected to any one of the WiBro and CDMA communication networks and provided with Internet services, and therefore, the radio wave reception strength of the WiBo and CDMA communication networks is detected again, and it is determined whether the user has entered an area appropriate to be connected to the WiBro communication network or the CDMA communication network.

Therefore, according to the method for connecting to a communication network of a wireless modem according to the specific embodiment of the present invention, since any one of the WiBro and CDMA modems is set to the working mode and the other modem is set to the sleep mode, as shown in FIGS. 3 and 4, a problem of requiring an extended booting time when the WiBro and CDMA modems are switched over can be solved while power limit of the USB port is not exceeded.

Figure 9:
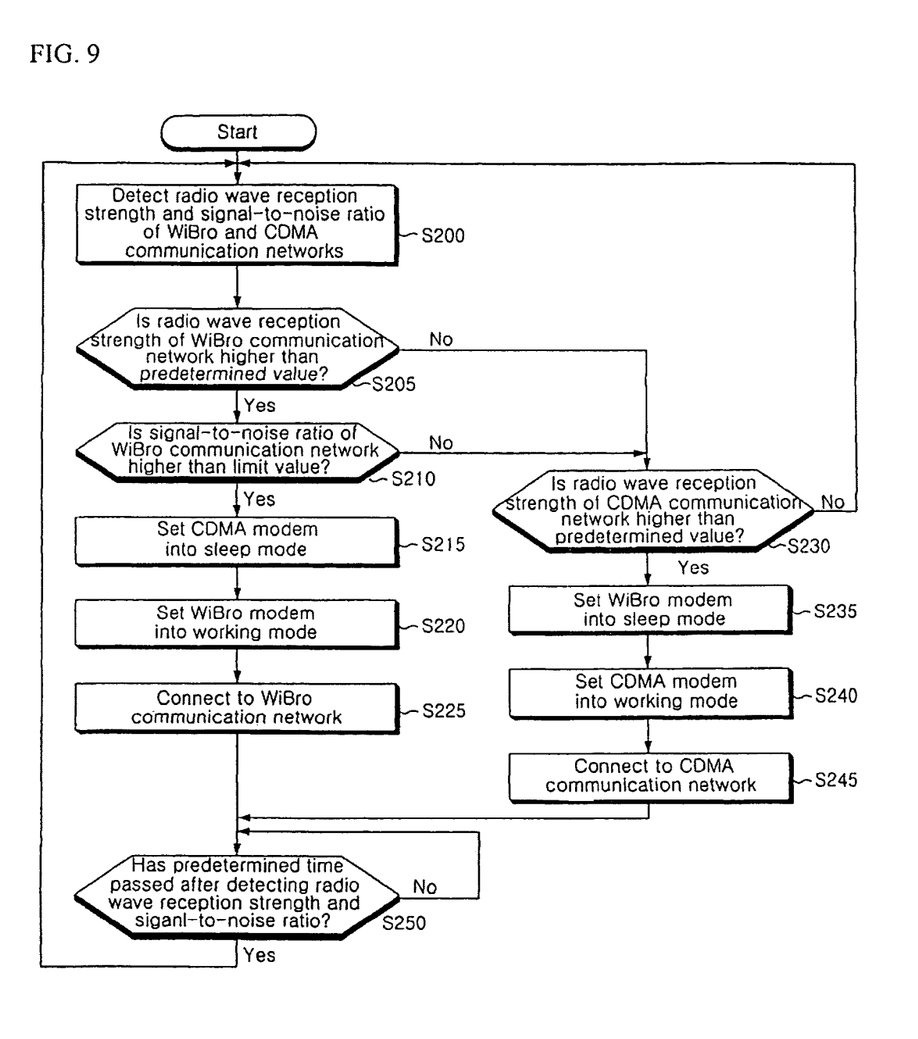
FIG. 9 is a flowchart specifically illustrating a method for connecting to a communication network of a wireless modem according to a further embodiment of the present invention.

FIG. 9 is a flowchart specifically illustrating a method for connecting to a communication network of a wireless modem according to a further embodiment of the present invention.

As shown in FIG. 9, the method for connecting to a communication network of a wireless modem according to the further embodiment of the present invention starts from a step of detecting radio wave reception strength and signal-to-noise ratio of WiBro and CDMA communication networks (step S200).

At this time, the radio wave reception strength and signal-to-noise ratio are detected in order to use the radio wave reception strength and signal-to-noise ratio of the WiBro and CDMA communication networks as criteria for determining whether the current position at which a user desires to connect to a communication network is in an area appropriate for connecting to the WiBro communication network or in an area appropriate for connecting to the CDMA communication network.

In addition, the signal-to-noise ratio of a communication network is a criterion used for power control and adaptive modulation and demodulation, such as a Carrier to Interference Noise Ratio (CINR), and is a value obtained by dividing the total sum of signal power of sub-carriers by the sum of noise and interference power. That is, it can be determined whether to set each of the WiBro and CDMA modems into the sleep mode or the working mode by detecting a value obtained by dividing the total sum of signal power of sub-carriers by the sum of noise and interference power.

Next, it is determined whether the radio wave reception strength of the WiBro communication network is higher than a predetermined value (step S205). At this time, if the radio wave reception strength of the WiBro communication network is higher than a predetermined value, step S210 is performed, whereas if the radio wave reception strength of the WiBro communication network is lower than the predetermined value, step S230 is performed.

At this time, the predetermined value may represent radio wave reception strength that is required to be provided with WiBro services in which the speed of transmitting and receiving data is recorded above a specific value.

Subsequently, if the radio wave reception strength of the WiBro communication network is higher than a predetermined value in step S205, it is determined whether the signal-to-noise ratio of the WiBro communication network is higher than a limit value (step S210). At this time, if the signal-to-noise ratio of the WiBro communication network is higher than a limit value, step S215 is performed, whereas if the signal-to-noise ratio of the WiBro communication network is lower than a limit value, step S230 is performed.

At this time, the limit value may represent a signal-to-noise ratio that is required to be provided with WiBro services in which the speed of transmitting and receiving data is recorded above a specific value.

Then, if the signal-to-noise ratio of the WiBro communication network is higher than a limit value in step S210, the CDMA modem is set into the sleep mode (step S215).

Subsequently, the WiBro modem is set into the working mode (step S220).

Next, the portable computer connects to the WiBro communication network through the WiBro modem (step S225).

In the meantime, if the radio wave reception strength of the WiBro communication network is lower than a predetermined value in step S205 or if the signal-to-noise ratio of the WiBro communication network is lower than a limit value in step S210, it is determined whether the radio wave reception strength of the CDMA communication network is higher than a predetermined value (step S230). At this time, if the radio wave reception strength of the CDMA communication network is higher than a predetermined value, step S235 is performed, whereas if the radio wave reception strength of the CDMA communication network is lower than a predetermined value, step S200 is performed.

At this time, the predetermined value may represent radio wave reception strength that is required to be provided with Internet services in which the speed of transmitting and receiving data through the CDMA modem is recorded above a specific value.

Next, if the radio wave reception strength of the CDMA communication network is higher than a predetermined value in step S230, the WiBro modem is set into the sleep mode (step S235).

Subsequently, the CDMA modem is set into the working mode (step S240).

Next, the portable computer connects to the CDMA communication network through the CDMA modem (step S245).

Subsequently, it is determined whether a predetermined time period has been passed after the radio wave reception strength and the signal-to-noise ratio are detected (step S250). At this time, if a predetermined time period has been passed after the radio wave reception strength and the signal-to-noise ratio are detected, step S200 is performed, whereas if a predetermined time period has not been passed after the radio wave reception strength and the signal-to-noise ratio are detected, step S250 is performed again.

That is, the radio wave reception strength and signal-to-noise ratio of the WiBro and CDMA communication networks of step S200 is detected at the predetermined time intervals. At this time, the predetermined time interval may be set to a time interval for detecting the radio wave reception strength to determine whether the portable computer deviates from or enters a WiBro service area.

In addition, if the radio wave reception strength of the CDMA communication network is lower than a predetermined value in step S230, this is a case where the radio wave reception strength of the CDMA communication network is lower than a predetermined value while the radio wave reception strength of the WiBro communication network is lower than the predetermined value or the signal-to-noise ratio of the WiBro communication network is lower than a limit value. Therefore, it is determined that a radio wave receive state is improper for the portable computer to be connected to the WiBro or CDMA communication network and provided with Internet services, and thus, step S200 is performed again.

That is, it is determined that the current position of the user is not an appropriate position to be connected to any one of the WiBro and CDMA communication networks and provided with Internet services, and therefore, and the radio wave reception strength and the signal-to-noise ratio of the WiBro and CDMA communication networks are detected again. Thus, it is determined whether the user has entered an area appropriate to be connected to the WiBro communication network or the CDMA communication network.

Therefore, according to the method for connecting to a communication network of a wireless modem according to the further embodiment of the present invention, since any one of the WiBro and CDMA modems is set to the working mode and the other modem is set to the sleep mode, as shown in FIGS. 3 and 4, a problem of requiring an extended booting time when the WiBro and CDMA modems are switched over can be solved while power limit of the USB port is not exceeded.

Figure 10:
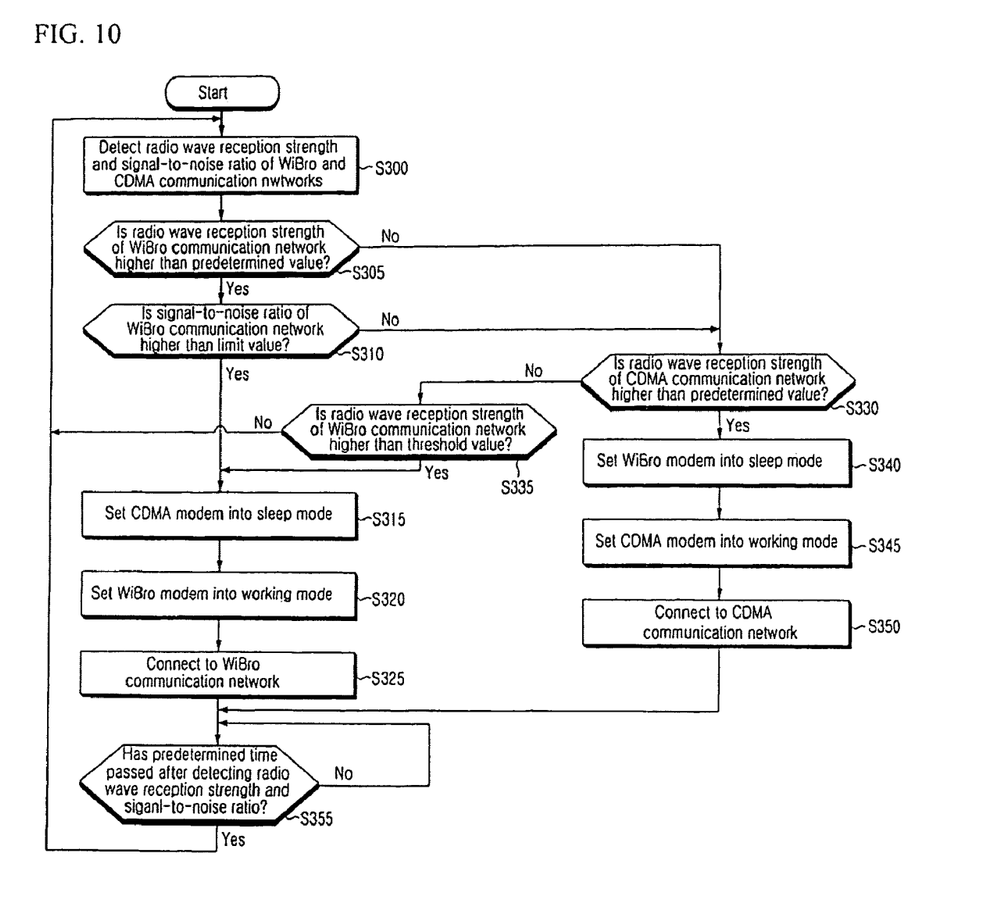
FIG. 10 is a flowchart specifically illustrating a method for connecting to a communication network of a wireless modem according to a still further embodiment of the present invention.

FIG. 10 is a flowchart specifically illustrating a method for connecting to a communication network of a wireless modem according to a still further embodiment of the present invention.

As shown in FIG. 10, the method for connecting to a communication network of a wireless modem according to the still further embodiment of the present invention starts from a step of detecting radio wave reception strength and signal-to-noise ratio of WiBro and CDMA communication networks (step S300).

Next, it is determined whether the radio wave reception strength of the WiBro communication network is higher than a predetermined value (step S305). At this time, if the radio wave reception strength of the WiBro communication network is higher than a predetermined value, step S310 is performed, whereas if the radio wave reception S330 is performed.

At this time, the predetermined value may represent radio wave reception strength that is required to be provided with WiBro services in which the speed of transmitting and receiving data is recorded above a specific value.

Subsequently, if the radio wave reception strength of the WiBro communication network is higher than a predetermined value in step S305, it is determined whether the signal-to-noise ratio of the WiBro communication network is higher than a limit value (step S310). At this time, if the signal-to-noise ratio of the WiBro communication network is higher than a limit value, step S315 is performed, whereas if the signal-to-noise ratio of the WiBro communication network is lower than a limit value, step S330 is performed.

At this time, the limit value may represent a signal-to-noise ratio that is required to be provided with WiBro services in which the speed of transmitting and receiving data is recorded above a specific value.

Then, if the signal-to-noise ratio of the WiBro communication network is higher than a limit value in step S310, the CDMA modem is set into the sleep mode (step S315).

Subsequently, the WiBro modem is set into the working mode (step S320).

Next, the portable computer connects to the WiBro communication network through the WiBro modem (step S325).

In the meantime, if the radio wave reception strength of the WiBro communication network is lower than a predetermined value in step S305 or if the signal-to-noise ratio of the WiBro communication network is lower than a limit value in step S310, it is determined whether the radio wave reception strength of the CDMA communication network is higher than a predetermined value (step S330). At this time, if the radio wave reception strength of the CDMA communication network is higher than a predetermined value, step S340 is performed, whereas if the radio wave reception strength of the CDMA communication network is lower than a predetermined value, step S335 is performed.

At this time, the predetermined value may represent a minimum predetermined value required to be connected to the CDMA communication network and to be provided with CDMA services.

Next, if the predetermined value of the CDMA communication network is lower than a predetermined value in step S330, it is determined whether the radio wave reception strength of the WiBro communication network is higher than a threshold value (step S335). At this time, if the radio wave reception strength of the WiBro communication network is higher than a threshold value, step S315 is performed, whereas if the radio wave reception strength of the WiBro communication network is lower than a threshold value, step S300 is performed.

At this time, the threshold value may represent minimum radio wave reception strength required to be provided with WiBro services. That is, if the radio wave reception strength of the WiBro communication network is higher than a threshold value in step S335, this is a case where WiBro services can be provided through the WiBro modem although the speed of transmitting and receiving data is not recorded above a specific value. The threshold value of step S335 may be a value higher than the predetermined value of step S305.

Subsequently, if the radio wave reception state of the CDMA communication network is higher than a predetermined value in step S330, the WiBro modem is set into the sleep mode (step S340).

Next, the CDMA modem is set into the working mode (step S345).

Subsequently, the portable computer connects to the CDMA communication network through the CDMA modem (step S350).

Next, it is determined whether a predetermined time period has been passed after the radio wave reception strength and the signal-to-noise ratio are detected (step S355). At this time, if a predetermined time period has been passed after the radio wave reception strength and the signal-to-noise ratio are detected, step S300 is performed, whereas if a predetermined time period has not been passed after the radio wave reception strength and the signal-to-noise ratio are detected, step S355 is performed again. WiBro and CDMA communication networks of step S300 is detected at the predetermined time intervals. At this time, the predetermined time interval may be set to a time interval for detecting the radio wave reception strength to determine whether the portable computer deviates from or enters a WiBro service area.

In addition, if the radio wave reception strength of the WiBro communication network is lower than a threshold value in step S335, this is a case where the radio wave reception strength of the CDMA communication network is lower than a predetermined value while the radio wave reception strength of the WiBro communication network is lower than a threshold value. Therefore, it is determined that a radio wave receive state is improper for the portable computer to be connected to the WiBro and CDMA communication networks and provided with Internet services, and step S300 is performed again.

In the previous discussion, the signal-to-noise ratio of the WiBro communication network was used as a parameter for setting modes. However, in another embodiment, the signal-to-noise ratio of the CDMA communication network may be used in parallel with or instead of the signal-to-noise ratio of the WiBro communication network. That is all occurrences of WiBro and CDMA may be reversed in FIGS. 8-10.

That is, it is determined that the current position of the user is not an appropriate position to be connected to any one of the WiBro and CDMA communication networks and provided with Internet services, and therefore, the radio wave reception strength and the signal-to-noise ratio of the WiBro and CDMA communication networks are detected again, and it is determined whether the user has entered an area appropriate to be connected to the WiBro communication network or the CDMA communication network.

Thus, according to the method for connecting to a communication network of a wireless modem according to the still further embodiment of the present invention, since any one of the WiBro and CDMA modems is set to the working mode and the other modem is set to the sleep mode, as shown in FIGS. 3 and 4, a problem of requiring an extended booting time when the WiBro and CDMA modems are switched over can be solved while power limit of the USB port is not exceeded.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

The scope of the present invention is not limited to the embodiments described and illustrated above but is defined by the appended claims. It will be apparent that those skilled in the art can make various modifications and changes thereto within the scope of the invention defined by the claims.

What is claimed is:

1. A wireless modem connection apparatus, comprising:
   a connection unit configured to connect to a first modem and a second modem, the first and second modems connected to a respective one of a first and second communication network; and
   a control unit connected to the connection unit and configured to
      detect a radio wave reception strength of the first communication network,
      detect a radio wave reception strength of the second communication network, and
      set an operation mode of the first and second modems based on the radio wave reception strengths of the first and second communication networks,
   wherein the operation mode of each of the first and second modems includes a corresponding first and second modem working mode and a corresponding first and second modem sleep mode, and
   wherein the control unit is configured to shift the operation mode of the second modem from the second modem sleep mode to the second modem working mode when
      the operation mode of the second modem is in the second modem sleep mode, and
      the radio wave reception strength of the second communication network exceeds a second communication network predetermined value.

2. The apparatus as claimed in claim 1, wherein the control unit is further configured to
   detect a signal-to-noise ratio of the second communication network, and
   shift the operation mode of the second modem from the second modem sleep mode to the second modem working mode when
      the operation mode of the second modem is in the second modem sleep mode,
      the radio wave reception strength of the second communication network exceeds a second communication network predetermined value, and
      the signal-to-noise ratio of the second communication network exceeds a limit value.

3. The apparatus as claimed in claim 1, wherein
   the control unit is configured to shift the operation mode of the second modem from the second modem working mode to the second modem sleep mode when
      the operation mode of the second modem is in the second modem working mode,
      the radio wave reception strength of the second communication network falls below a second communication network predetermined value, and
      the radio wave reception strength of the first communication network exceeds a first communication network predetermined value.

4. The apparatus as claimed in claim 1, wherein the control unit is further configured to
   detect a signal-to-noise ratio of the second communication network, and
   shift the operation mode of the second modem from the second modem working mode to the second modem sleep mode when
      the operation mode of the second modem is in the second modem working mode,
      the signal-to-noise ratio of the second communication network falls below a limit value or the radio wave reception strength of the second communication network falls below a second communication network predetermined value, and
      the radio wave reception strength of the first communication network exceeds a first communication network predetermined value.

5. The apparatus as claimed in claim 1, wherein
   the first modem comprises one of the group consisting of Wireless Broadband Internet (WiBro) modem and a Code Division Multiple Access (CDMA) modem,
   the second modem comprises another of the group consisting of the Wireless Broadband Internet (WiBro) modem and the Code Division Multiple Access (CDMA) modem, and
   the first and second communication networks comprise a respective WiBro communication network and CDMA communication network.

6. The apparatus as claimed in claim 2, wherein
   the first modem comprises one of the group consisting of Wireless Broadband Internet (WiBro) modem and a Code Division Multiple Access (CDMA) modem,
   the second modem comprises another of the group consisting of the Wireless Broadband Internet (WiBro) modem and the Code Division Multiple Access (CDMA) modem, and
   the first and second communication networks comprise a respective WiBro communication network and CDMA communication network.

7. The apparatus as claimed in claim 3, wherein
   the first modem comprises one of the group consisting of Wireless Broadband Internet (WiBro) modem and a Code Division Multiple Access (CDMA) modem,
   the second modem comprises another of the group consisting of the Wireless Broadband Internet (WiBro) modem and the Code Division Multiple Access (CDMA) modem, and
   the first and second communication networks comprise a respective WiBro communication network and CDMA communication network.

8. The apparatus as claimed in claim 4, wherein
   the first modem comprises one of the group consisting of Wireless Broadband Internet (WiBro) modem and a Code Division Multiple Access (CDMA) modem,
   the second modem comprises another of the group consisting of the Wireless Broadband Internet (WiBro) modem and the Code Division Multiple Access (CDMA) modem, and
   the first and second communication networks comprise a respective WiBro communication network and CDMA communication network.

9. The apparatus as claimed in claim 1, wherein the control unit is configured to detect the radio wave reception strengths of the first and second communication networks at predetermined time intervals.

10. The apparatus as claimed in claim 1, wherein
the control unit is further configured to detect a signal-to-noise ratio of the second communication network, and
the control unit is configured to detect the radio wave reception strengths of the first and second communication networks and the signal-to-noise ratio of the second communication network at predetermined time intervals.

11. A method of wireless communication via a first modem and a second modem, the first and second modems connected to a respective one of a first and second communication network, comprising:
detecting a radio wave reception strength of the first communication network;
detecting a radio wave reception strength of the second communication network; and
setting an operation mode of the first and second modems based on the radio wave reception strengths of the first and second communication networks.
wherein the step of setting an operation mode comprises:
setting a corresponding first and second modem working mode and a corresponding first and second modem sleep mode,
the method further comprising:
shifting the operation mode of the second modem from the second modem sleep mode to the second modem working mode when
the operation mode of the second modem is in the second modem sleep mode, and
the radio wave reception strength of the second communication network exceeds a second communication network predetermined value.

12. The method as claimed in claim 11, further comprising:
detecting a signal-to-noise ratio of the second communication network; and
shifting the operation mode of the second modem from the second modem sleep mode to the second modem working mode when
the operation mode of the second modem is in the second modem sleep mode,
the radio wave reception strength of the second communication network exceeds a second communication network predetermined value, and
the signal-to-noise ratio of the second communication network exceeds a limit value.

13. The method as claimed in claim 11, further comprising:
shifting the operation mode of the second modem from the second modem working mode to the second modem sleep mode when
the operation mode of the second modem is in the second modem working mode,
the radio wave reception strength of the second communication network falls below a second communication network predetermined value, and
the radio wave reception strength of the first communication network exceeds a first communication network predetermined value.

14. The method as claimed in claim 11, further comprising:
detecting a signal-to-noise ratio of the second communication network; and
shifting the operation mode of the second modem from the second modem working mode to the second modem sleep mode when
the operation mode of the second modem is in the second modem working mode,
the signal-to-noise ratio of the second communication network falls below a limit value or the radio wave reception strength of the second communication network falls below a second communication network predetermined value, and
the radio wave reception strength of the first communication network exceeds a first communication network predetermined value.

15. The method as claimed in claim 11, wherein
the first modem comprises one of the group consisting of Wireless Broadband Internet (WiBro) modem and a Code Division Multiple Access (CDMA) modem,
the second modem comprises another of the group consisting of the Wireless Broadband Internet (WiBro) modem and the Code Division Multiple Access (CDMA) modem, and
the first and second communication networks comprise a respective WiBro communication network and CDMA communication network.

16. The method as claimed in claim 12, wherein
the first modem comprises one of the group consisting of Wireless Broadband Internet (WiBro) modem and a Code Division Multiple Access (CDMA) modem,
the second modem comprises another of the group consisting of the Wireless Broadband Internet (WiBro) modem and the Code Division Multiple Access (CDMA) modem, and
the first and second communication networks comprise a respective WiBro communication network and CDMA communication network.

17. The method as claimed in claim 12, wherein
the first modem comprises one of the group consisting of Wireless Broadband Internet (WiBro) modem and a Code Division Multiple Access (CDMA) modem,
the second modem comprises another of the group consisting of the Wireless Broadband Internet (WiBro) modem and the Code Division Multiple Access (CDMA) modem, and
the first and second communication networks comprise a respective WiBro communication network and CDMA communication network.

18. The method as claimed in claim 13, wherein
the first modem comprises one of the group consisting of Wireless Broadband Internet (WiBro) modem and a Code Division Multiple Access (CDMA) modem,
the second modem comprises another of the group consisting of the Wireless Broadband Internet (WiBro) modem and the Code Division Multiple Access (CDMA) modem, and
the first and second communication networks comprise a respective WiBro communication network and CDMA communication network.

19. The method as claimed in claim 11, further comprising:
detecting the radio wave reception strengths of the first and second communication networks at predetermined time intervals.

20. The method as claimed in claim 11, further comprising:
detecting a signal-to-noise ratio of the second communication network; and
detecting the radio wave reception strengths of the first and second communication networks and the signal-to-noise ratio of the second communication network at predetermined time intervals.

* * * * *